Patented Aug. 6, 1940

2,210,817

UNITED STATES PATENT OFFICE 2,210,817

SUPERPOLYCARBONATE

Wesley R. Peterson, Wilmington, Del., assignor to E. I. du Pont de Nemours & Company, Wilmington, Del., a corporation of Delaware No Drawing. Application April 19, 1939, Serial No. 268,819

5 Claims. (Cl. 260—2)

The invention herein described relates to polymeric materials. More specifically, it relates to improved methods of making superpolycarbonates from glycols and monomeric esters of carbonic acid.

Polycarbonates have previously been prepared by reacting glycol and carbonic esters. The methods heretofore disclosed, however, are incapable of yielding products of molecular weight sufficiently high to confer fiber-forming properties to the polymer.

This invention has as an object a new method for making fiber-forming or superpolycarbonates of glycols. Other objects will appear hereinafter.

These objects are accomplished by reacting a glycol, in which the hydroxyl groups are separated by at least four atoms, with a monomeric ester of carbonic acid in the presence of alkali metal and a small amount of high boiling carboxylic acid sparingly soluble in water, washing the reaction mixture in a manner which removes the alkali metal but which leaves at least a trace of the carboxylic acid, and then heating at reduced pressure until substantial increase in the molecular weight of the polymerizate takes place, and preferably until a high molecular weight polymer is obtained. A monomeric ester of the carboxylic acid may be used instead of the acid itself.

I have found, in order to obtain polycarbonates of the high molecular weight required to yield upon cold drawing useful textile fibers of the kind described in Patent 2,071,250, that a trace of a carboxylic acid must be present during the final heating period. Thus, superpolyalkylene carbonates may be prepared by a sodium-catalyzed ester-interchange between substantially chemically equivalent amounts of an ester-free glycol to which has been added a trace of a high boiling carboxylic acid or monomeric ester thereof, and a monomeric ester of carbonic acid. The amount of acidic catalyst added is not critical, but there should be an excess of alkali metal present. The reaction mixture is heated at atmospheric pressure preferably in the temperature range 150–200° C. until the elimination of alcohol is substantially complete and then under reduced pressure to remove the last traces of alcohol. The alkaline catalyst is removed, but not the carboxylic acid, by washing the residue dissolved in a volatile solvent (generally benzene or toluene) first with dilute hydrochloric acid and then repeatedly with water. This procedure does not remove the carboxylic acid as is the case when continued washing with water is used to remove the alkaline catalyst. When water is used to remove the alkaline catalyst the carboxylic acid is also removed as the sodium salt. But when the washing in accordance with the present invention is conducted first with dilute hydrochloric acid the free carboxylic acid liberated remains in the polymerizate since the free acid being insoluble in water is not removed by subsequent washing with water. After distillation of the solvent, the polymerization is completed by heating at elevated temperature (200–250° C.) and reduced pressure (preferably 2 hours at 250° C. under 3 mm. pressure) until a high molecular weight product having an intrinsic viscosity in chloroform of at least 0.4 and a melt viscosity of at least 1000 poises at 139° C. is obtained.

The following examples are illustrative of methods that can be used in practicing my invention.

EXAMPLE I

Superpolyhexamethylene carbonate

Equimolar quantities of ester-free hexamethylene glycol (69.8 g.) and dibutyl carbonate (102.8 g.) with a trace of sodium in 2 cc. of butanol containing 1 drop of ethyl adipate were heated in an oil bath in a 38 mm. test tube fitted with a side arm. The temperature of the bath was increased from 150°–200° C. during a period of one hour at atmospheric pressure followed by one-half hour periods at 200° C. under 500 mm. and 230 mm. pressures and finally for two hours at 200° C. under 20 mm. pressure. The intermediate polymerizate was dissolved in toluene and the solution was divided into 2 portions. The alkaline catalyst was removed from the first portion by washing three times with water, then once with dilute hydrochloric acid, and finally three times with water. The toluene was distilled and the residue heated for two hours at 250° C. under 3 mm. pressure. The product had a melt viscosity of only 119 poises at 139° C. The alkaline catalyst was removed from the second portion by washing the toluene solution first with dilute hydrochloric acid and then three times with water, thereby not removing the adipic acid. Completion of the polymerization by heating for two hours at 250° C. under 3 mm. pressure gave a tough, horny product having an intrinsic viscosity in chloroform of 0.57 and a melt viscosity of 2710 poises at 139° C. Cold-rolled films had tensile strengths of 8290 and 4190 lbs./sq. in. (27,700 and 23,300 lbs./sq. in. at break) along the oriented and unoriented axes, respectively.

EXAMPLE II

Superpolydiethylene glycol carbonate

Equimolar quantities of diethylene glycol (55.4 g.) and dibutyl carbonate (92.6 g.) with a trace of sodium in 2 cc. of butanol to which had been added a drop of diethyl adipate, were heated in an oil bath in a 38 mm. test tube. The temperature of the bath was increased from 150°–200° C. during a period of one hour and the heating was continued at 200° C. for one hour at atmospheric pressure, for one-half hour under 500 mm. pressure, then for one-half hour under 230 mm. pressure, and finally for one hour at 20 mm. pressure. The alkaline catalyst was removed from the intermediate polymerizate (25 poises at 64° C.) by washing a chloroform solution first with dilute hydrochloric acid and finally three times with water. The polymerization was completed after distillation of the solvent by heating at 250° C. under 3 mm. pressure for five hours. The product, a light-colored viscous sirup, had a melt viscosity of 1165 poises at 139° C. In a similar run made without the addition of diethyl adipate, the product after heating at 250° C. under 3 mm. pressure for seven hours had a melt viscosity of 323 poises at 139° C.

The different nature of the polymer obtained when the reaction is carried out in the presence of a carboxylic acid or ester thereof as compared to the polymer obtained in the absence of these ingredients is further shown by the following experiments in which a few crystals of adipic acid or one drop of ethyl adipate were added to the intermediate polymerizate of Example I (melt viscosity 131 poises at 64° C.) free of alkaline catalyst before the final heating period. The products obtained after heating for two hours at 250° C. under 3 mm. pressure had intrinsic viscosities in chloroform of 0.46 and 0.53 and melt viscosities of 633 and 2100 poises at 139° C., respectively. Cold-rolled films had tensile strengths at break of 15,700 and 7,220 lbs./sq. in. and 19,100 and 22,300 lbs./sq. in., respectively, along the oriented and unoriented axes, respectively. Polymers prepared from the same intermediate polymerizate without the addition of adipic acid or ethyl adipate had melt viscosities as low as 225 and 262 poises at 139° C. and cold-rolled films had tensile strengths at break of only 7000 and 1800 lbs./sq. in. and 6200 and 1400 lbs./sq. in., respectively, along the oriented and unoriented axes, respectively.

Considerable variation is permissible in the conditions such as time, temperature, and pressure used during the preparation of the intermediate polymerizate and during the completion of the polymerization.

Other dihydric alcohols in which the hydroxyl groups are separated by at least four atoms, as for instance tetramethylene glycol, alpha-methyl tetramethylene glycol, alpha-dimethyl tetramethylene glycol, alpha-methyl pentamethylene glycol, octamethylene glycol, 1,4-dihydroxycyclohexane, phthalyl alcohol, 1,3-xylylene alcohol, nonomethylene glycol, decamethylene glycol, tetradecamethylene glycol, and triethylene glycol, may replace those previously mentioned. Other esters of carbonic acid, such as diethyl carbonate, diphenyl carbonate, dibenzyl carbonate, ethyl butyl carbonate, dipropyl carbonate, and diisopropyl carbonate, may be used. The carboxylic acids or monomeric esters thereof include such compounds as sebacic acid, lauric acid, stearic acid, palmitic acid, and their alkyl esters.

Other alkaline catalysts besides sodium may be used for the ester interchange. For example, metallic lithium, metallic calcium or potassium carbonate are operative.

The process described herein, unlike that previously used in reacting glycols and carbonic acid esters, yields fiber- and film-forming superpolyalkylene carbonates. The products are also useful in the coating, plastic, molding, sizing, impregnating, adhesive, textile, and related arts.

As many apparently widely different embodiments of this invention may be made without departing from the spirit and scope thereof, it is to be understood that I do not limit myself to the specific embodiments thereof except as defined in the appended claims.

I claim:

1. A process which comprises reacting a glycol, in which the hydroxyl groups are separated by at least four atoms, with a monomeric ester of carbonic acid in the presence of an alkali metal and a small amount of a substance of the class consisting of high boiling carboxylic acids sparingly soluble in water and monomeric esters thereof, said alkali metal being in excess of the quantity sufficient to neutralize the acid material present in the reaction mixture, removing the alkali metal and retaining said substance, and further polymerizing the polymer thus obtained.

2. A process which comprises reacting a glycol, in which the hydroxyl groups are separated by at least four atoms, with a monomeric ester of carbonic acid in the presence of an alkali metal and a small amount of a substance of the class consisting of high boiling carboxylic acids sparingly soluble in water and monomeric esters thereof, said alkali metal being in excess of the quantity sufficient to neutralize the acid material present in the reaction mixture, removing the alkali metal and retaining said substance, and heating the polymerizate under reduced pressure until the polymer obtained is capable of being formed into filaments which upon cold drawing exhibit molecular orientation along the fiber axis.

3. A process which comprises reacting a glycol, in which the hydroxyl groups are separated by at least four atoms, with a monomeric ester of carbonic acid in the presence of an alkali metal and a small amount of a substance of the class consisting of high boiling carboxylic acids sparingly soluble in water and monomeric esters thereof, said alkali metal being in excess of the quantity sufficient to neutralize the acid material present in the reaction mixture, removing the alkali metal and retaining said substance by washing with dilute mineral acid and then with water, and further polymerizing the polymer thus obtained.

4. A process for making polyhexamethylene carbonate which comprises reacting hexamethylene glycol with a monomeric ester of carbonic acid in the presence of an alkali metal and a small amount of a substance of the class consisting of high boiling carboxylic acids sparingly soluble in water and monomeric esters thereof, said alkali metal being in excess of the quantity sufficient to neutralize the acid material present in the reaction mixture, removing the alkali metal and retaining said substance, and further polymerizing the polymer thus obtained.

5. A process for making polydiethyleneglycol carbonate which comprises reacting diethylene glycol with a monomeric ester of carbonic acid in the presence of an alkali metal and a small amount of a substance of the class consisting of high boiling carboxylic acids sparingly soluble in water and monomeric esters thereof, said alkali metal being in excess of the quantity sufficient to neutralize the acid material present in the reaction mixture, removing the alkali metal and retaining said substance, and further polymerizing the polymer thus obtained.

WESLEY R. PETERSON.